United States Patent [19]

Tao

[11] 3,928,194

[45] Dec. 23, 1975

[54] EMULSION BREAKING METHOD

[75] Inventor: Fan-Sheng Tao, Houston, Tex.

[73] Assignee: Texaco Inc., New York, N.Y.

[22] Filed: Aug. 23, 1974

[21] Appl. No.: 499,887

Related U.S. Application Data

[63] Continuation-in-part of Ser. No. 301,020, Oct. 26, 1972, abandoned.

[52] U.S. Cl. ................................. 210/43; 252/328
[51] Int. Cl.$^2$ .......................................... B01D 17/04
[58] Field of Search ................. 210/43, 49, 54, 56; 252/328–331, 346–349

[56] References Cited
UNITED STATES PATENTS

| | | | |
|---|---|---|---|
| 1,617,737 | 2/1927 | Averill | 252/328 X |
| 1,617,739 | 2/1927 | Averill | 252/328 |

*Primary Examiner*—Thomas G. Wyse
*Attorney, Agent, or Firm*—T. H. Whaley; C. G. Ries; Kenneth R. Priem

[57] ABSTRACT

A method is disclosed for separating oil and water emulsions into substantially distinct phases of oil and water. The method entails adding a demulsifier and an excess of water to the oil and water emulsion at ambient conditions and then mixing the oil, water, and demulsifier in such a way that the oil and water will separate into substantially separate phases when the mixing ceases.

20 Claims, No Drawings

EMULSION BREAKING METHOD

This is a continuation-in-part of copending application Ser. No. 301,020 filed Oct. 26, 1972 now abandoned.

BACKGROUND OF THE INVENTION

1. Field of the Invention

This invention relates to the field of emulsion breaking.

2. Description of the Prior Art

Emulsions are dispersions of small drops of one liquid in another liquid. The two liquids must be insoluble in one another. Emulsions are formed by a variety of methods including lowering the surface tensions of the liquid components using a surface active material known as an emulsifier and agitation. Many emulsions are formed of oil and water. Oil is defined generally as a liquid insoluble in water.

It is often necessary to separate the components of an emulsion of an oily material and water into substantially pure oily material, hereinafter referred to as oil and water. This separation may be necessary in order to dispose of water without violating pollution regulations or to recover the oil for future use. Other reasons may arise which will necessitate the separation of oil and water from an emulsified state into distinct phases.

An example of prior art emulsion breaking processes is the oil field heater treater. Emulsified crude oil and water produced from subterranean reservoirs is introduced into these devices and heat is applied. At times a demulsifying compound is also added to aid in the separation of the oil and water. The conventional heater treaters have disadvantages, however. The fuel requirement not only adds to expense but also creates difficulties in remote areas where a dependable fuel supply is not readily available. Since produced crude oil is highly flammable, a fire hazard is also present when heater treaters are used. A most serious disadvantage is the reduction in value of the crude oil itself which may result due to the heating. Reliable data indicate that there is an oil volume loss of approximately one percent and an oil gravity decrease of 0.6° API for 36° API crude, when the treating temperature is elevated 40°F at 40 psig. Significant losses in income will result from such volume and gravity changes.

Chemelectric treaters operate at lower temperatures than the conventional heater treaters and provide an improvement in degree. They will require heat, however, with all its attendant problems.

Averill's U.S. Pat. No. 1,617,739 claims a process whereby first, water is added to the emulsion, next the water-emulsion mixture is mixed and finally a chemical demulsifier is added to the mixture. Averill further states at page 3, first column, lines 23–26, that it is immaterial whether the chemical demulsifying agent is introduced into the emulsion before or after the emulsion is mixed.

Applicant has suprisingly discovered, however, that the order of addition of the demulsifier is indeed material. It is an object of this invention to provide a demulsification method which is a vast improvement over the process of Averill.

Hereinafter, an emulsion is used to mean a system consisting of very finely divided particles of one liquid in another liquid not entirely soluble with the first liquid. An emulsion will not separate to a great degree without some externally applied physical or chemical change. An emulsion is stable or unstable depending on the degree of difficulty involved in separating the two liquids. A dispersion is used to mean a distribution of particles of one liquid in another wherein the liquids will separate when any agitation or mixing action ceases.

SUMMARY OF THE INVENTION

A method for separating an oil and water emulsion into substantially separate oil and water phases which comprises converting the emulsion into a dispersion which will separate into substantially distinct phases upon settling. The conversion to the dispersion is accomplished at ambient temperature by mixing with a demulsifier or by first adding a demulsifier and a sufficient quantity of the material in the emulsified or noncontinuous phase to effect an inversion so that the noncontinuous material becomes the continuous phase and then mixing this inverted emulsion until a dispersion is formed.

DESCRIPTION OF THE PREFERRED EMBODIMENTS

The method of this invention is useful for separating emulsions of oil and water into separate, substantially distinct phases at ambient temperatures. The term oil in the broadest sense is meant to include that class of liquids not soluble in water to any significant degree. More specifically, oils are greasy, combustible materials obtained from animal, vegetable or mineral sources, such as petroleum, and are liquid at room temperatures. They are soluble in certain organic solvents but not in water. Water, as used herein, includes fresh water and water with considerable mineral content such as brine from subterranean formations.

In a broad embodiment of this invention it was discovered that an emulsion of the A/B type could be broken at ambient temperature by the addition of a demulsifying agent and the application of mild mixing. Mild stirring is defined as that quantity and nature of mixing which will keep the "A" phase droplets at a constant average size. When this type of equilibrium occurs the demulsifier is able to reach the "A" phase droplets and rupture the protective film around them. The "A" phase droplets may then coalesce and form a continuous phase. When the mixing is stopped the two phases will substantially separate and form distinct phases.

Often a stable A/B emulsion is found wherein the A phase will not coalesce to a significant degree and consequently the emulsion cannot be broken, i.e., separated into substantially distinct phases. This type of situation often exists, for example, in oil field water in oil (W/O) type emulsions. In order to more completely separate the oil and water, the water in oil emulsion must be changed to an oil in water (O/W) emulsion before further treatment. Generally, the process of the invention is this situation consists of inversion of the water in oil emulsion to an oil in water emulsion by adding water and a demulsifying agent followed by mixing and settling. It is imperative to the method of my invention that the demulsifier be added before mixing.

INVERSION

Generally, a water in oil type emulsion can be inverted into an oil in water type emulsion by addition of water. The volume ratio of the inner discontinuous phase to the outer continuous phase is 0.74, which represents the close packing of spheres. Therefore, addition of water would increase this ratio and the water in oil emulsion would invert to an oil in water emulsion. However, it has been found that the inversion point of oil-water systems does not follow this rule strictly and depends upon many factors including: the nature of oil, inorganic additives in the oil and water phases, surface active materials and their concentration in the emulsion, temperature and mixing conditions. See Mitsu, T., Machida, Y., and Harnsawa, "An Application of the Phase Inversion Temperature Method the Emulsification of Cosmetics. I. Factors A Heating Phase - Invertion Temperature", Bulletin of the Chemical Society of Japan, 43, 3044–3048 (1970).

In an application of the present invention to break an oil and water emulsion from a producing oil facility, for example, an effective amount of water or brine available in the oil field would be added to the produced emulsion. The exact amount of water needed to effect inversion could be determined by one skilled in the art using the above enumerated criteria.

DEMULSIFIER

It has been discovered that, in general, if a water in oil emulsion is inverted into an oil in water emulsion by addition of additional water, the original emulsified water will remain emulsified within the droplets of oil after inversion. Therefore, an emulsion within an emulsion is formed. In order to free this internally trapped emulsified water, addition of a demulsifier and mixing are required as well as water.

The demulsifier may be added to the oil and water emulsion either before, concurrently or after addition of the water so long as it is added before the mixing step. Demulsifiers are well known in the art, and include, for example, oxyalkylated amines, salts of alkylaryl sulfonic acid, oxyalkylated phenolic resins, polymeric amines, glycol esters, polyoxyalkylated glycol esters, polyoxyethylated glycol esters, fatty acid esters, oxyalkylated polyols, low molecular weight oxyalkylated resins and polyoxyalkylene glycols. This enumeration is, of course, not exhaustive and other demulsifying agents or mixtures thereof will occur to one skilled in the art. Most demulsifiers which are commercially available fall into chemical classifications such as those enumerated above. The exact composition of a particular compound and/or its molecular weight is usually a trade secret, however. Despite this, one skilled in the art is able to select demulsifiers using general chemical classifications. The amount of demulsifier to be added will vary with the emulsion system to be broken, but in general a sufficient amount of demulsifier is in the range of about 1 to 1000 parts per million (ppm) and preferably from about 5 to 50 ppm. more or less may be used depending on the system and the economics.

MIXING

Mixing is required in most cases to aid in the inversion of water in oil emulsions into oil in water dispersions. Also, mixing keeps the emulsified oil droplets at equilibrium size by allowing some oil droplets to break and some to coalesce so that the overall size of the oil droplets remains constant. This apparently allows the demulsifying agent to reach the oil droplets and rupture the protective film around the yet smaller water droplets emulsified within the oil droplets. These small water droplets will then coalesce with the bulk water of the oil in water emulsion allowing for a more complete final separation of oil and water than has heretofore been possible. In my invention the mixing must follow the addition of water and demulsifier to the emulsion.

The mixing should be thorough but not sufficient to disperse fine oil droplets in the water. In other words, the mixing should be regulated so as to aid in coalescence not to further emulsify the oil and water. The mixing should also be uniform so that no dead spot exists in the mixture. Also, little if any oil should be permitted to accumulate at the surface of the fluid. The rate and type of mixing will vary with each emulsion system encountered, but one skilled in the mixing art will be able to determine the proper method of mixing without undue difficulty.

EXPERIMENTAL

The following data discloses experiments whereby identical emulsions were treated in the same way with the same demulsifier except that in the runs labeled (a), the demulsifier was added prior to the addition of the water as in my invention and in the runs labeled (b), the demulsifier was added after the addition of the water and after mixing as is done in Averill's U.S. Pat. No. 1,617,739. In each case the percent BS&W in the oil phase of the runs (a) done in accordance with my invention is considerably lower than the percent BS&W done according to the teachings and claims of Averill. These runs are denoted by (b). There is definite improvement in the method of my invention over that as claimed by Averill. The demulsifiers in each of the six "Runs" are different from any other "Run" even though the general chemical description may be the same.

In the examples below, each Run (1, 2, etc.) uses the same demulsifier, however, the (a) run is done in accordance with my invention as follows:

100 ml of emulsion, 100 ml of water, and 2 ml of a demulsifier (in a 2% mixture with an inert aromatic solvent) were mixed at 650 rpm's for 10 minutes. The mixture was then allowed to settle in a 250 ml graduated cylinder. The percentage BS&W in the separated oil phase was measured. In the runs labeled (b) 100 ml of emulsion identical to that in the runs labeled (a) was mixed with 100 ml of water. This emulsion-water mixture was then mixed at 650 rpm for 10 minutes in an identical manner as the runs labeled (a). At this point, 2 ml of the same demulsifier solvent mixture was added. The mixture was allowed to settle and again the percentage BS&W in the oil layer was measured. In each of the six runs, the method using the order of addition specified in the claims of my application (a) gave better results than the runs using the technique as disclosed and claimed by Averill, (b). In all respects save the order of addition of the demulsifier (a) and (b) runs were identical.

DATA

RUN 1 (low molecular weight oxyalkylated polyol demulsifier)
 a. % BS&W = 0.5% (demulsifier added before mixing)
 b. % BS&W = 2.0% (demulsifier added after mixing)
RUN 2 (oxyalkylated phenolic resin demulsifier)
 a. % BS&W = 0.5% (demulsifier added before mixing)
 b. % BS&W = 3.0% (demulsifier added after mixing)
RUN 3 (polyoxyethylated glycol ester as demulsifier)

a. % BS&W = 0.25% (demulsifier added before mixing)
b. % BS&W = 2.3% (demulsifier added after mixing)
RUN 4 (oxyalkylated phenolic resin demulsifier)
a. % BS&W = 2.0% (demulsifier added before mixing)
b. % BS&W = 3.3% (demulsifier added after mixing)
RUN 5 (oxyalkylated phenolic resin demulsifier)
a. % BS&W = 0.5% (demulsifier added before mixing)
b. % BS&W = 2.8% (demulsifier added after mixing)
RUN 6 (oxyalkylated glycol and polyoxyethylated glycol ester as demulsifier)
a. % BS&W in top 20 ml oil = 0.6% (demulsifier added before mixing) % BS&W in next 20 ml oil = 0.8%
b. % BS&W in top 20 ml oil = 3.3% (demulsifier added after mixing) % BS&W in next 20 ml oil = 4.8%

Two methods were devised to further demonstrate the usefulness of the invention and to present a demonstration of the effect of variables on the performance of my invention.

A. Single Stage Method

The laboratory procedure consisted of addition of the proper amount of demulsifier comprising oxyalkylated glycol and polyoxyethylated glycol ester (2 percent solution) and synthetic brine* directly to 100 ml of oilfield emulsion, at ambient temperature. This mixture was stirred by a 2 inch propeller at a selected mixing rate. Immediately after mixing, the above mixture was transferred to a container and allowed to settle. Basic sediment and water (BS&W) content of the treated oil was determined by the standard API method. Separated free water was also recorded.

*Prepared according to the analyzed sodium chloride content of field brine. The amount varied from 0 to 100 ml, according to the need for keeping the mixture in the oil in water inversion state.

During the tests, the effects of mixing rate and time, amount of demulsifier, and brine/oil ratio on demulsification were also investigated. Optimum conditions then were determined.

Six oilfield emulsions from the Gulf Coast area were treated by the single stage method. Studies to determine the effect of the operating parameters were conducted initially.

The effect of mixing rate and time on percent BS&W of treated crude is demonstrated in Table I. The water in oil emulsion (W/O) was inverted to an oil in water (O/W) dispersion, during addition of an equal amount of brine, at mixing rates above approximately 180 rpm. At mixing rates below 180 rpm, inversion did not occur; when brine was added, thick W/O emulsion (with percent BS&W higher than original) was formed. Lower BS&W values were obtained at higher mixing rates and longer mixing times.

The effect of demulsifier concentration on percent BS&W of treated crude is demonstrated in Table II. When demulsifier concentration was below 0.02 percent based on pure demulsifier, phase inversion sometimes did not occur. At demulsifier concentrations above 0.02 percent, BS&W of the treated crude decreased gradually, reaching a minimum of about 0.06 percent demulsifier.

The effect of water/oil ratio on percent BS&W of treated crude is demonstrated in Table III. Only moderate changes in BS&W were observed for water/oil ratios between approximately 1.5 to 3.5.

Under optimum conditions, the single stage method reduced BS&W of six oilfield emulsions significantly as shown in Table IV.

B. Two Stage Method

The method consisted of the following two stages.

1. First Stage - Mixing followed by settling.

In a container, 100 ml of oilfield emulsion was mixed, at ambient temperature, with a selected demulsifier comprising oxyalkylated phenolic resins, oxyalkylated glycols and polyoxyethylated glycol esters, using a two-inch propeller, at a predetermined mixing rate. No brine was added in this stage. Immediately after mixing, the fluid was transferred to a 100 ml graduated cylinder. After settling, the mixture separated into an oil portion at the top and an emulsion at the bottom. A 50 ml sample was taken from the top of the cylinder by pipette and BS&W was determined by the standard method. This procedure was used to determine optimum operating conditions (mixing rate and time, demulsifier concentration, and settling time) for the first stage. Tests were repeated at the optimum operating conditions so that incremental samples (from top to bottom) could be taken from the graduated cylinder after settling. Percent BS&W then was determined for each sample to obtain information on the distribution of emulsified water.

2. Second Stage - Inversion followed by settling.

Base upon the results of the first stage BS&W tests, the clean oil and emulsion portions were separated. Synthetic brine was added to the separated emulsion portion (including any free water). The brine was added in amounts of from about 40 to 100 percent of the separated emulsion and free water. The brine and emulsion were then mixed at a selected mixing rate, causing inversion of the W/O emulsion into an O/W dispersion. Immediately after mixing, the dispersion was poured into a graduated cylinder. After settling, incremental samples were taken of the oil and emulsion layers, from top to bottom, by pipette. Percent BS&W was then determined for each sample.

Four out of six of the above oilfield emulsions were treated by the two stage method, as follows:

1. First Stage

Optimum operating conditions for first stage treatment were determined initially be performing successive experiments on mixing rate and time, demulsifier concentration, and settling time. Typical results for the effect of mixing rate and time are presented in Table V. The optimum mixing rate for Sour Lake emulsion was between 100–200 rpm, fine water droplets were dispersed in the oil phase, giving a more stable emulsion and, consequently, higher BS&W values. When the mixing rate was below approximately 100 rpm demulsifier was not well dispersed; hence poor separation and higher BS&W were obtained.

After first stage treatment under optimum conditions, BS&W of incremental samples were determined for Sour Lake crude. The results indicated that the top 80 percent (of the fluid column) was pipeline grade oil; only the bottom 20 percent required second stage treatment (inversion by addition of brine and mixing).

2. Second Stage

In all cases studied, it was found that no additional demulsifier was required after first stage treatment. Therefore, residual emulsions obtained from the first stage settling column were mixed with predetermined amounts of brine to invert the emulsion. Because of the similarity of the inversion methods, information obtained from the single stage method was applicable to the second stage of the two stage method. A high percentage of water was separated by second stage settling, leaving a zone of low BS&W oil (approximately one percent) at the top. A thin emulsion layer generally was found at the oil-water interface after second stage settling. Tests indicated that this emulsion layer could be either treated by recycling to the container where brine was added to cause inversion of the emulsion, or by transferring it to a third stage inverter. However, reliable steady state recycling results can be obtained only in a continuous apparatus. The maximum amount of oil to be recycled (indicated by batch tests) was 5.3 percent of total oil treated (Table VII).

Oil from the top phases of the first and second stages were combined, giving average BS&W values of 0.5–0.7 percent (Table VI).

DISCUSSION

The two stage method was more effective in treating relatively stable emulsions than the single stage method; occasionally the single stage method would be effective, however, in treating less stable emulsions. Both methods separated more water than was obtained by gravity settling, in the presence of demulsifier at ambient temperature (Table VII).

Treating temperatures indicated that the inversion technique successfully treated emulsions at 70°–75°F, which was as much as 80°F below the field treating temperature.

CONCLUSIONS

Five oilfield emulsion samples, with API gravities (oil phase) ranging from 23 to 38, were successfully treated at ambient temperature by a laboratory batch type inversion technique for demulsification. Among these five emulsions, one was treated successfully by a single stage inversion method, giving 0.4 percent BS&W in the treated oil; four were treated by a two stage method, giving 0.5–0.7 percent BS&W in the treated oil. Lower BS&W values can generally be obtained by increasing the retention time and amount of demulsifier.

TABLE I

EFFECT OF MIXING RATE AND TIME ON
PERCENT BS&W OF CRUDE OIL - SINGLE STAGE METHOD

Sample: Delta Duck Club (Unit Number 1) Emulsion, Plaquemines Parish, Louisiana.
Demulsifier: JM 32, 2 ml/100 ml Emulsion.
Sample Water Content: 42 Percent
Brine/Emulsion Ratio: 1 (W/O Ratio = 2.45)

| Run No. | Mixing Rate, RPM | Mixing Time, Min. | BS&W, % |
|---|---|---|---|
| 570-22-4 | 250 | 5 | 36 |
| 570-22-5 | 440 | 5 | 32 |
| 570-22-6 | 630 | 5 | 30 |
| 570-22-7 | 250 | 10 | 24 |
| 570-22-8 | 440 | 10 | 28 |
| 570-22-9 | 630 | 10 | 21 |
| 570-22-10 | 250 | 20 | 23 |
| 570-22-11 | 440 | 20 | 23 |
| 570-22-12 | 630 | 20 | 16 |
| 570-22-13 | 125 | 20* | 58.7 |

*Gel-like W/O emulsion formed three minutes after mixing; after mixing for 20 minutes, no appreciable change was observed.

TABLE II

EFFECT OF DEMULSIFIER CONCENTRATION ON
PERCENT BS&W OF CRUDE OIL - SINGLE STAGE METHOD*

Sample: Delta Duck Club (Unit Number 1) Emulsion, Plaquemines Parish, Louisiana.

| Run No. | Demulsifier, % | Free Water* Volume, % | BS&W After Treatment (Calculated, % |
|---|---|---|---|
| 535-37-1 | 0.01 | 0 (Gelled) | 61.3 |
| 535-37-2 | 0.02 | 28 | 19.5 |
| 535-37-3 | 0.04 | 34 | 12.1 |
| 535-37-4 | 0.08 | 34 | 12.1 |
| 535-37-5 | 0.06 | 36 | 8.9 |
| 535-37-8 | 0.01 | 20 | 27.5 |

*Mixed at 620 RPM for 10 minutes with 100 ml brine added to 100 ml emulsion. Settling time was 20 minutes. Test was performed at ambient temperature.

TABLE III

EFFECT OF W/O RATIO ON PERCENT BS&W
OF TREATED CRUDE OIL - SINGLE STAGE METHOD

Sample: Delta Duck Club (Unit Number 1) Emulsion, Plaquemines Parish, Louisiana.
Amount of Sample Used: 100 ml
Demulsifier: JM 32 2 ml/100 ml Emulsion
Mixing Rate: 620 RPM
Mixing Time: 10 Minutes
Settling Time: 20 Minutes
Salt Content of Brine: 11 Percent

| Run No. | Amount of Brine Added, ml | W/O Ratio | BS&W, % |
|---|---|---|---|
| 570-24-1 | 100 | 2.45 | 13 |
| 570-24-5 | 50 | 1.59 | 15 |
| 570-24-6 | 150 | 4.17 | 19 |
| 570-24-10 | 0 | 0.725 | 42 |

TABLE IV

PERCENT WATER REMOVED BY SINGLE STAGE METHOD

| | BS&W, % Before Treatment | BS&W, % After Treatment* | Water Removed, % | BS&W Near Surface of Treated Oil, % |
|---|---|---|---|---|
| Delta Duck Club Unit Number 1 Plaquemines Parish, Louisiana | 42.0 | 8.9 | 79.0 | 1.0 – 2.0 |
| Delta Duck Club Unit Number 2 Plaquemines Parish, | | | | |

TABLE IV-continued

PERCENT WATER REMOVED BY SINGLE STAGE METHOD

| | BS&W, % Before Treatment | BS&W, % After Treatment* | Water Removed, % | BS&W Near Surface of Treated Oil, % |
|---|---|---|---|---|
| Louisiana | 31.7 | 10.4 | 67.0 | 0.5 (Top 10%)** 0.75 (2nd 10%) |
| Sour Lake Field, Wells No. 581 & 583, Hardin County, Texas | 19.4 | 4.3 | 78.0 | 0.5 (Top 10%) 0.6 (2nd 10%) |
| L. A. Silliman Ganado Field, Brazoria County, Texas | 50.0 | 0.4 | 99.2 | 0.25 (Top 20%) 0.4 (Oil Portion Above Interface) |
| Hultquist Ganado Field Brazoria County, Texas | 35.0 | 7.2 | 79.5 | 0.6 |
| Phillips, Well No. 10, West Columbia Field, Brazoria County, Texas | 49.0 | 40.0 | 18.5 | 1.0 |

*Percent BS&W obtained for crudes treated under optimum conditions.
**Top 10% of the total fluids were taken from the top of the fluid column in the graduated cylinder; 2nd 10% of the total fluids were taken next to the top 10%.

TABLE V

EFFECT OF MIXING RATE AND TIME ON BS&W OF OIL PHASE - TWO STAGE METHOD, FIRST STAGE

Sample: Sour Lake (Tank Battery Number 4, Wells No. 581 & 583) Hardin County, Texas
BS&W of the Sample - 19.4 Percent
Demulsifier - Visco 420, 2 ml/100 ml Emulsion
Settling Time - 20 Minutes
Sample Portion - Top 50% after Settling (First Stage)

| Run No. | Mixing Rate, RPM | Mixing Time, Minutes | BS&W, % |
|---|---|---|---|
| 570-38-B1 | 220 | 2 | 0.75 |
| 570-38-B2 | 220 | 5 | 0.75 |
| 570-38-B3 | 220 | 10 | 0.85 |
| 570-38-B4 | 660 | 2 | 1.70 |
| 570-38-B5 | 660 | 5 | 6.80 |
| 570-38-B6 | 660 | 10 | 14.0 |
| 570-40-5 | 110 | 2 | 0.7 |
| 570-40-7 | 50 | 2 | 1.8 |
| 570-40-9 | 50 | 5 | 1.35 |
| 570-40-10 | 110 | 5 | 0.5 |
| 570-40-11 | 110 | 10 | 0.3 |
| 570-40-12 | 50 | 10 | 0.6 |

TABLE VI

AMOUNT AND QUALITY OF OIL AND EMULSION PRODUCED BY TWO STAGE METHOD

| | Oil Produced Percent of Total Oil 1st Stage | Oil Produced Percent of Total Oil 2nd Stage | BS&W, % 1 & 2 Stages | Emulsion Remaining After Second Stage Settling % of Original Emulsion | Emulsion Remaining After Second Stage Settling BS&W % | Emulsion Remaining After Second Stage Settling % of Original Oil |
|---|---|---|---|---|---|---|
| Delta Duck Club Unit Number 2 | 55.2 | 41.0 | 0.54 | 6.0 | 54 | 3.8 |
| Hultquist | 79.0 | 17.3 | 0.56 | 4.0 | 30 | 3.7 |
| Phillips Well No. 10 | 58.9 | 38.5 | 0.70 | 8.9 | 75 | 2.6 |
| Sour Lake | 88.5 | 6.2 | 0.50 | 5.7 | 15 | 5.3 |

TABLE VII

COMPARISON OF WATER SEPARATION BY GRAVITY SETTLING AND THE INVERSION TECHNIQUE

| | Water Separated By Gravity Settling* | | Water Separated By Inversion (Without Recycling)* | | |
|---|---|---|---|---|---|
| | % of Total Emulsion | % of Total Water | Method Used | % of Total Emulsion | % of Total Water |
| Delta Duck Club Unit Number 2 | 0 | 0 | Two Stage | 28.4 | 89.5 |
| Hultquist | 30 | 85.7 | Two Stage | 33.4 | 95.4 |
| Phillips No. 10 | 3 | 19.5 | Two Stage | 8.1 | 52.6 |
| L. A. Silliman | 2 | 4.0 | Single Stage | 49.6 | 99.2 |
| Sour Lake | 2 | 10.3 | Two Stage | 18.1 | 93.4 |

*Same total processing time and same amount of demulsifier were used for the gravity settling and inversion methods. Tests were performed at ambient temperatures (70-75°F.).

I claim:

1. A method for converting a water in oil emulsion into an oil in water dispersion at ambient temperature which may then be allowed to settle and separate into substantially separate oil and water phases comprising: mixing a mixture comprising a water in oil emulsion, an amount of water sufficient to effect inversion of the emulsion and an effective amount of a demulsifier selected from the group consisting of oxyalkylated amines, salts of alkyl-aryl sulfonic acid, oxylkylated phenolic resins, polymeric amines, glycol esters, polyoxyalkylated glycol esters, polyoxyethylated glycol esters, fatty acid esters, polyoxyethylated glycol esters, fatty acid esters, oxyalkylated polyols, oxyalkylated glycols sufficient to form an oil in water dispersion.

2. The method of claim 1 wherein the resulting oil in water dispersion is allowed to separate into substantially separate phases of oil and water upon ceasing mixing.

3. The method of claim 1 wherein the demulsifier is added to the water in oil emulsion in an amount from about 1 to 1000 parts per million.

4. A method as in claim 1 wherein the treating temperature is below about 100°F.

5. A method as in claim 4 wherein the treating temperature is from about 70°F to about 75°F.

6. A method as in claim 4 wherein the mixing is accomplished using a rotating propeller-like device.

7. A method as in claim 1 wherein the mixing is accomplished using a rotating propeller-like device.

8. A method as in claim 1 wherein the mixing is continued for more than 5 minutes.

9. A method as in claim 1 wherein the treating temperature is below about 100°F and the mixing is accomplished using a propeller-like device for more than 5 minutes.

10. A method for separating an emulsion comprising an oil and water into substantially separate phases of oil and water at ambient temperature comprising:
   a. mixing a mixture comprising a water in oil emulsion and an effective amount of a demulsifier selected from the group consisting of oxyalkylated amines, salts of alkyl-aryl sulfonic acid, oxyalkylated phenolic resins, polymeric amines, glycol esters, polyoxyalkylated glycol esters, polyoxyethylated glycol esters, fatty acid esters, oxyalkylated polyols, oxyalkylated glycols, low molecular weight oxyalkylated resins and polyoxyalkylene glycols;
   b. allowing the emulsion and demulsifier mixture to settle into separate oil and emulsion phases, said emulsion phase containing said demulsifier;
   c. separating the oil phase and the emulsion phase;
   d. mixing a mixture comprising the emulsion from step (c) with a sufficient amount of water to cause inversion into an oil in water dispersion; and
   e. allowing the resulting dispersion to come to rest so that the oil and water will separate substantially into separate phases.

11. The method of claim 10 wherein the amount of demulsifier added is from about 1 to 1000 parts per million.

12. A method as in claim 10 wherein the treating temperature is below about 100°F.

13. A method as in claim 12 wherein the treating temperature is from about 70°F to about 75°F.

14. A method as in claim 12 wherein the mixing is accomplished using a rotating propeller-like device.

15. A method as in claim 10 wherein the mixing is accomplished using a rotating propeller-like device.

16. A method as in claim 10 wherein the mixing steps are continued for more than 5 minutes.

17. A method as in claim 10 wherein the treating temperature is below about 100°F and the mixing is accomplished using a propeller-like device for more than 5 minutes.

18. A method for separating a water in oil emulsion comprising into substantially separate phases of oil and water at a temperature below about 100°F comprising:
   a. adding an effective amount of a demulsifier to the emulsion,
   b. mixing the emulsion and the demulsifier mixture with a rotating propeller-like device for more than 5 minutes until said mixture separates into an oil phase and an emulsion phase when mixing ceases,
   c. separating the oil phase and the emulsion phase, said emulsion phase containing said demulsifier,
   d. adding to the emulsion phase a sufficient amount of water to cause an inversion into an oil in water emulsion,
   e. mixing this inverted emulsion with a propeller-like device for more than 5 minutes until a dispersion is formed and f. allowing the dispersion to come to rest so that the oil and water will separate into substantially separate phases.

19. A method for converting a water in oil emulsion into an oil in water dispersion at a temperature below about 100°F which may then be allowed to settle and separate into substantially separate oil and water phases comprising mixing with a rotating propeller-like device for more than five minutes to form an oil in water dispersion a mixture comprising a water in oil emulsion, an amount of water sufficient to effect inversion of the emulsion and an effective amount of a demulsifier selected from the group consisting of oxyalkylated amines, salts of alkyl-aryl sulfonic acid, oxyalkylated phenolic resins, polymeric amines, glycol esters, polyoxyalkylated glycol esters, polyoxyethylated glycol esters, fatty acid esters, oxyalkylated polyols, oxyalkylated glycols, low molecular weight oxyalkylated resins and polyoxyalkylene glycols sufficient to form an oil in water dispersion.

20. A method for separating an emulsion comprising oil and water into substantially separate phases of oil and water and at temperature below about 100°F comprising:

a. mixing a mixture comprising a water in oil emulsion and an effective amount of a demulsifier selected from the group consisting of oxyalkylated amines, salts of alkyl-aryl sulfonic acid, oxyalkylated phenolic resins, polymeric amines, glycol esters, polyoxyalkylated glycol esters, polyoxyethylated glycol esters, fatty acid esters, oxyalkylated polyols, oxyalkylated glycols, low molecular weight oxyalkylated resins and polyoxyalkylene glycols with a rotating propeller-like device for more than five minutes until said mixture separates into an oil phase and an emulsion phase when mixing ceases;

b. separating the oil phase and the emulsion phase, said emulsion phase containing said demulsifier;

c. mixing a mixture comprising the emulsion from step (b) with a sufficient amount of water to cause inversion into an oil in water dispersion; and d. allowing the resulting dispersion to come to rest so that the oil and water will separate substantially into separate phases.

* * * * *